No. 630,271. Patented Aug. 1, 1899.
G. E. STANLEY.
EMERGENCY BRAKE FOR CARS OR VEHICLES.
(Application filed July 14, 1898.)
(No Model.)
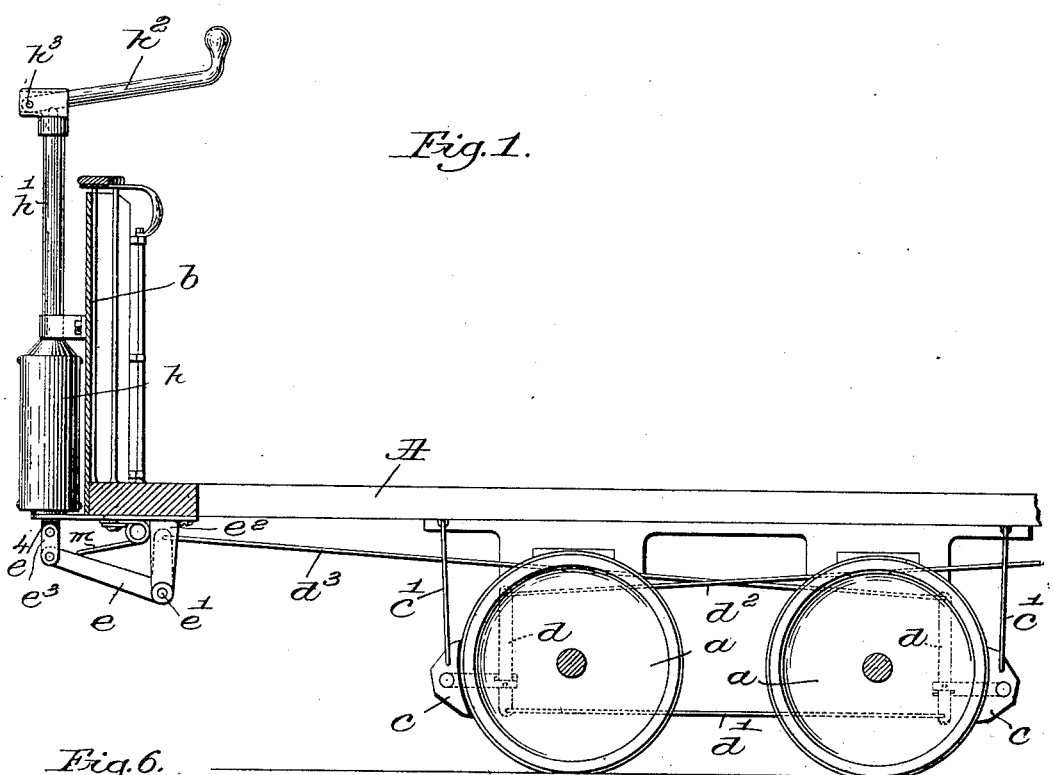
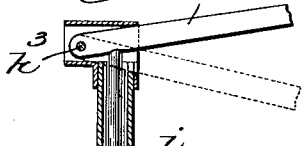
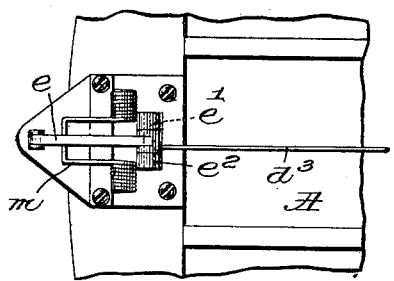
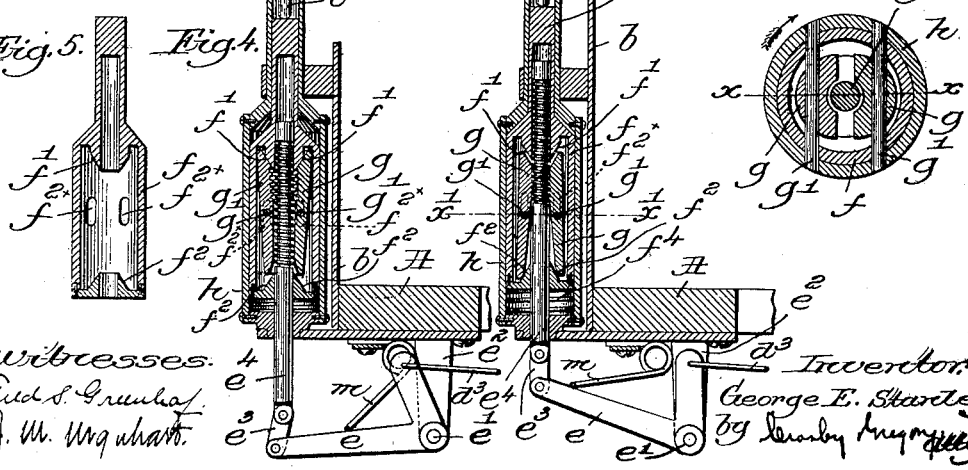

UNITED STATES PATENT OFFICE.

GEORGE E. STANLEY, OF WHITMAN, MASSACHUSETTS, ASSIGNOR OF ONE-HALF TO JOHN E. MILES, OF BOSTON, MASSACHUSETTS.

EMERGENCY-BRAKE FOR CARS OR VEHICLES.

SPECIFICATION forming part of Letters Patent No. 630,271, dated August 1, 1899.

Application filed July 14, 1898. Serial No. 685,951. (No model.)

*To all whom it may concern:*

Be it known that I, GEORGE E. STANLEY, of Whitman, county of Plymouth, State of Massachusetts, have invented an Improvement in Emergency-Brakes for Cars or Vehicles, of which the following description, in connection with the accompanying drawings, is a specification, like letters on the drawings representing like parts.

This invention relates to brakes for railway-cars, the invention having especial reference to street-cars or in fact any cars where it is of advantage to provide for a quick or emergency application of the brakes.

In the following specification, in connection with the accompanying drawings, I will describe my invention in the best form in which it is now known to me, although it should be distinctly understood that my invention is not limited to the form selected for description, for it may be embodied in various forms, according to the preferences of the manufacturer or the requirements of any particular or peculiar service.

In the drawings, Figure 1, in side elevation and partial section, shows a sufficient portion of a car and its equipment to enable my invention to be understood; Fig. 2, a vertical longitudinal section of the form of brake actuating and controlling mechanism shown in Fig. 1, the section being on the dotted line $x$ $x$, Fig. 3; Fig. 3, an enlarged horizontal section on the dotted line $x$ $x$, Fig. 2; Fig. 4, a sectional detail similar to Fig. 2, but with the parts in different positions; Fig. 5, a detail of the emergency sleeve or actuator to be described, and Fig. 6 a detail looking upwardly at the under side of the platform.

I will now describe my invention as contained in the embodiment illustrated in the drawings.

The car may be of any usual or desired construction, it being herein typified in the platform A, supported upon suitable or usual wheels $a$ $a$, which may be rigid on the body or arranged in usual swivel-trucks, as desired.

The usual dasher is indicated at $b$.

The brake proper, which may be of any desired form, is here shown as comprising the brake-shoes $c$ $c$, carried by the brake-hangers $c'$, said shoes being connected with and moved toward and from the wheels in usual manner by the levers $d$ $d$ and rods $d'$, $d^2$, and $d^3$. The rod $d^3$, through which the brakes, as shown, are actuated, is shown as connected at its outer end with one arm of a bell-crank lever $e$, pivoted at $e'$ in a bracket $e^2$, depending from the car-platform. The other arm of the bell-crank lever $e$ is shown as connected by a link $e^3$ with the lower end of a vertical rod $e^4$, threaded at its upper end and hereinafter referred to as the "screw." This screw $e^4$ is received within the sleeve $f$, Fig. 5, the sleeve being freely movable on and with reference to the screw.

Within the sleeve $f$ and shown as formed integrally therewith are the oppositely-arranged cones $f'$ $f^2$, arranged to act upon and separate alternately the opposite ends of two levers $g$ $g$, fulcrumed upon pivots $g'$, which pass through slots $f^{2\times}$ in the sleeve $f$ and are supported at their ends in and by the outer casing or cylinder $h$, Fig. 3. These two levers $g$ $g$ are threaded at their upper ends to embrace and engage the threads on the screw $e^4$, the said levers being made to open away from the screw and to close into engagement with the screw, according as their upper ends are separated by depression of the sleeve $f$ and cone $f'$ or their lower ends separated by the raising of the sleeve $f$ and cone $f^2$. These two levers thus constitute, in effect, one form of separable or multipart nut.

The casing $h$, which receives and contains the vertically-movable sleeve $f$, has an upwardly-extended tubular neck or stem $h'$, secured to the dasher, but in such manner that it, with its contained sleeve and separable nut, may be rotated in either direction. For this purpose the upper end of the tubular neck $h$ is provided with a suitable brake-controlling member, (shown as a handle $h^2$.)

With the parts in the positions shown in Figs. 1 and 2 rotation of the brake-handle, with its attached parts, including the separable nut, in one direction—for example, to the right in the direction of the arrow, Fig. 3—will cause the screw $e^4$ to be forced downwardly, thereby to depress the bell-crank lever $e$ and apply the brake. Opposite rotation of the brake-handle raises the screw $e^4$ and performs that operation of the brake known as "brake-release," this being the normal operation of the brake in the ordinary service applications thereof.

For emergency applications I have provided the following as a convenient mechanism:

The brake-handle $h^2$ is horizontally pivoted at $h^3$ in the neck $h'$ of the casing, so that said handle may be raised and lowered, it being normally sustained in elevated position by the rod $i$, telescopically arranged within the neck $h'$ and resting upon the closed upper end $f^3$ of the sliding sleeve $f$, which latter in turn is yieldingly supported in elevated position by a spring $f^4$, interposed between the lower end of said sleeve $f$ and the closed bottom of the casing $h$. A powerful spring $m$ acts upon and tends normally to depress the bell-crank lever $e$.

In cases of emergency the operator in control of the car instead of consuming the time required for application of the brake by rotation of the handle $h^2$ merely depresses the handle in whatever rotative position it may be for the time being, thereby through the rod $i$ depressing the sleeve $f$, causing its cone $f'$ to separate the levers $g$ constituting the separable nut. This frees the screw $e^4$ and permits the spring $m$ to depress the bell-crank lever $e$ and apply the brakes instantly and with all the power of the spring $m$. Subsequently the brake may be released by releasing the depressed handle $h^2$, which permits the spring $f^4$ to raise the sleeve $f$ and through the cone $f^2$ close the nut upon the screw, after which rotation of the handle $a^2$ will lift the screw and release the brake. Obviously after emergency application the handle $h^2$ may be released to engage the nut and screw and the latter further depressed by rotation of the handle to increase the application of the brake over and above the power of the emergency-spring $m$.

By utilizing the screw principle for release of the brake I have found that the brake may be easily released even against the pressure of the emergency-spring $m$, so that the latter does not throw objectionable work upon the operator controlling the car.

My invention is not limited to the particular embodiment herein shown and described, but may be varied within the spirit and scope of the invention as herein set forth and claimed.

The term "mechanically connected" used in some of the claims as defining the connections between the operating-handle and the brake mechanism is intended to refer to connections primarily mechanical between the operating-handle and the brake, whereby movement of said handle acts through said connections to perform mechanically some of the operations of the brake as distinguished from the fluid-pressure type of brake, wherein the movement of the operating-handle sets in motion a fluid under pressure, which, acting through diaphragms, pistons, or equivalent devices, itself causes or produces the brake operations and as to which the operating-handle acts merely as a controller, without furnishing the power which actually performs some of the operations.

Having fully described my invention, what I claim, and desire to secure by Letters Patent, is—

1. In a brake mechanism for cars, brake devices, and a manual operating member mechanically connected therewith, and having distinct movements one of which causes service application of the brake mechanism and the other emergency application thereof.

2. A brake mechanism for cars the same having a brake-controlling member rotation of which in one plane applies the brake in service applications thereof and movement of which in a different plane produces emergency applications of the brake.

3. A brake mechanism for cars the same having a brake-controlling member rotation of which in a horizontal plane applies the brake in service applications thereof and vertical movement of which produces emergency application of the brake.

4. In a brake mechanism for cars, brake devices, a brake-controlling member mechanically connected therewith and having one kind of movement to effect service application of the brake, an emergency-spring, and means whereby a different kind of movement of said controlling member causes said spring to act to cause emergency application of the brake.

5. In a brake mechanism for cars, brake devices, a brake-controlling member mechanically connected therewith whereby said controlling member furnishes means by which to effect service application of the brake, and means independent of said controlling member but controlled thereby for effecting emergency application of said brake.

6. In a brake mechanism for cars, brake devices, a brake-controlling member mechanically connected therewith, so as to produce some of the operations of the brake mechanism, means tending constantly to apply the brake, said brake-controlling member having distinct movements one of which permits emergency application of the brake by said means, the other movement of which causes slower service application of said brake.

7. In a brake mechanism for cars, means tending constantly to apply the brake, a brake-handle one movement of which permits emergency application of the brake by said means, and another and distinct manual movement of which produces manual application of the brake to augment the emergency application by said means.

8. In a brake mechanism for cars, means tending constantly to apply the brake, a screw, and a controlling member operating in connection therewith, to permit operation of said means to apply the brake, and to release the brake in opposition to said means.

9. In a brake mechanism for cars, means tending constantly to apply the brake, a screw governing the application of the brake, a separable nut in engagement with the screw, a controlling member, and means operated thereby to cause relative rotation of the nut and screw for operating or controlling the brake, and means to separate said nut to free the screw for emergency applications.

10. In a brake mechanism for cars, means tending constantly to apply the brake, a rotatable casing provided with a controlling member, a vertically-movable sleeve within the said casing and controlled by vertical movement of the brake-handle, the separable nut within said sleeve and opened and closed by vertical movement of the sleeve relatively to said casing, and the screw coöperating with said nut, all to operate substantially as described.

In testimony whereof I have signed my name to this specification in the presence of two subscribing witnesses.

GEORGE E. STANLEY.

Witnesses:
　LOUIS N. GOWELL,
　FREDERICK L. EMERY.